United States Patent [19]
Grigsby et al.

[11] Patent Number: 4,905,869
[45] Date of Patent: Mar. 6, 1990

[54] APPARATUS FOR SAFE STORAGE AND DISPENSATION OF SLICED BREAD

[76] Inventors: David E. Grigsby, 929 Midway Dr., Dunbar, W. Va. 25064; Stanley J. Polidori, Rte. 5, Box 251-1/2, Charleston, W. Va. 25312

[21] Appl. No.: 342,720

[22] Filed: Apr. 25, 1989

Related U.S. Application Data

[63] Continuation of Ser. No. 943,051, Dec. 18, 1986, abandoned.

[51] Int. Cl.[4] .................. B65G 59/00; B65H 3/00
[52] U.S. Cl. ................................. 221/92; 221/124; 221/195; 221/279; 221/282; 221/286; 312/61
[58] Field of Search ............ 221/64, 65, 92, 123, 221/124, 154, 191, 194, 195, 197, 198, 226, 227, 228, 229, 230, 231, 232, 252, 271, 279, 270, 272, 282, 286, 287, 306, 312 C; 312/35, 42, 61, 71; 211/51, 59.3; 232/1 D, 4 R, 12, 17; 426/115

[56] References Cited

U.S. PATENT DOCUMENTS

| 193,794 | 10/1862 | Bullock . | |
|---|---|---|---|
| 1,005,128 | 10/1911 | Blain . | |
| 1,418,153 | 5/1922 | Lorber | 221/279 |
| 1,513,248 | 10/1924 | Johnson | 221/270 X |
| 1,702,987 | 2/1929 | Wilson | 211/49 |
| 1,732,643 | 10/1929 | Dierks | 211/51 X |
| 1,743,770 | 1/1930 | Greavu | 221/279 |
| 1,902,239 | 3/1933 | Holdgrafer | 312/61 X |
| 1,917,480 | 7/1933 | Widing | 312/71 |
| 2,083,843 | 6/1937 | Hicks | 312/61 X |
| 2,108,825 | 2/1938 | Morris | 221/92 X |
| 2,211,349 | 8/1940 | Nye | 221/154 |
| 2,303,880 | 12/1942 | Hilton et al. | 221/252 X |
| 2,426,999 | 9/1947 | Hilton et al. | 221/256 X |
| 2,812,990 | 11/1957 | Smith | 312/71 |
| 2,819,819 | 1/1958 | Warren | 221/256 |
| 2,919,051 | 12/1959 | Wideburg et al. | 221/195 X |
| 3,161,320 | 12/1964 | Swanson | 221/255 |
| 3,298,568 | 1/1967 | Brocq | 221/255 X |
| 3,326,413 | 6/1967 | Anderson | 221/255 X |
| 3,578,207 | 5/1971 | Danow | 221/232 |
| 4,000,831 | 1/1977 | House | 221/227 X |
| 4,034,895 | 7/1977 | Ortiz | 221/289 X |
| 4,136,802 | 1/1979 | Mascia et al. | 312/71 X |
| 4,266,668 | 5/1981 | Paek | 206/557 |
| 4,500,145 | 2/1985 | Fassauer | 312/61 |

Primary Examiner—Joseph J. Rolla
Assistant Examiner—Edward S. Ammeen
Attorney, Agent, or Firm—Lowe, Price, LeBlanc, Becker & Shur

[57] ABSTRACT

A flexible container of bread slices has bellows-like foldable longitudinal sides, having a closed end and an open end. It is located within a somewhat larger casing provided with a closable lid, an open end of the flexible container being effectively sealable by a flexible soft cushion mounted to an inside surface of the lid of the outer casing. A small breathing aperture is provided in the lid, and the cushion allows passage of air or vapors through the breathing aperture to let the stored bread slices breathe with little evaporation from the bread slices. A manually movable platen plate supported within the outer casing biases a closed end of the flexible bread container toward the lid. Individual bread slices are dispensed when the casing lid is opened, with additional bias provided by moving the platen plate forward. In one aspect of the invention, the casing is provided wiht lids at both ends and two separate flexible containers are provided to store separate pluralities of bread slices for simultaneous dispensation at either end.

22 Claims, 3 Drawing Sheets

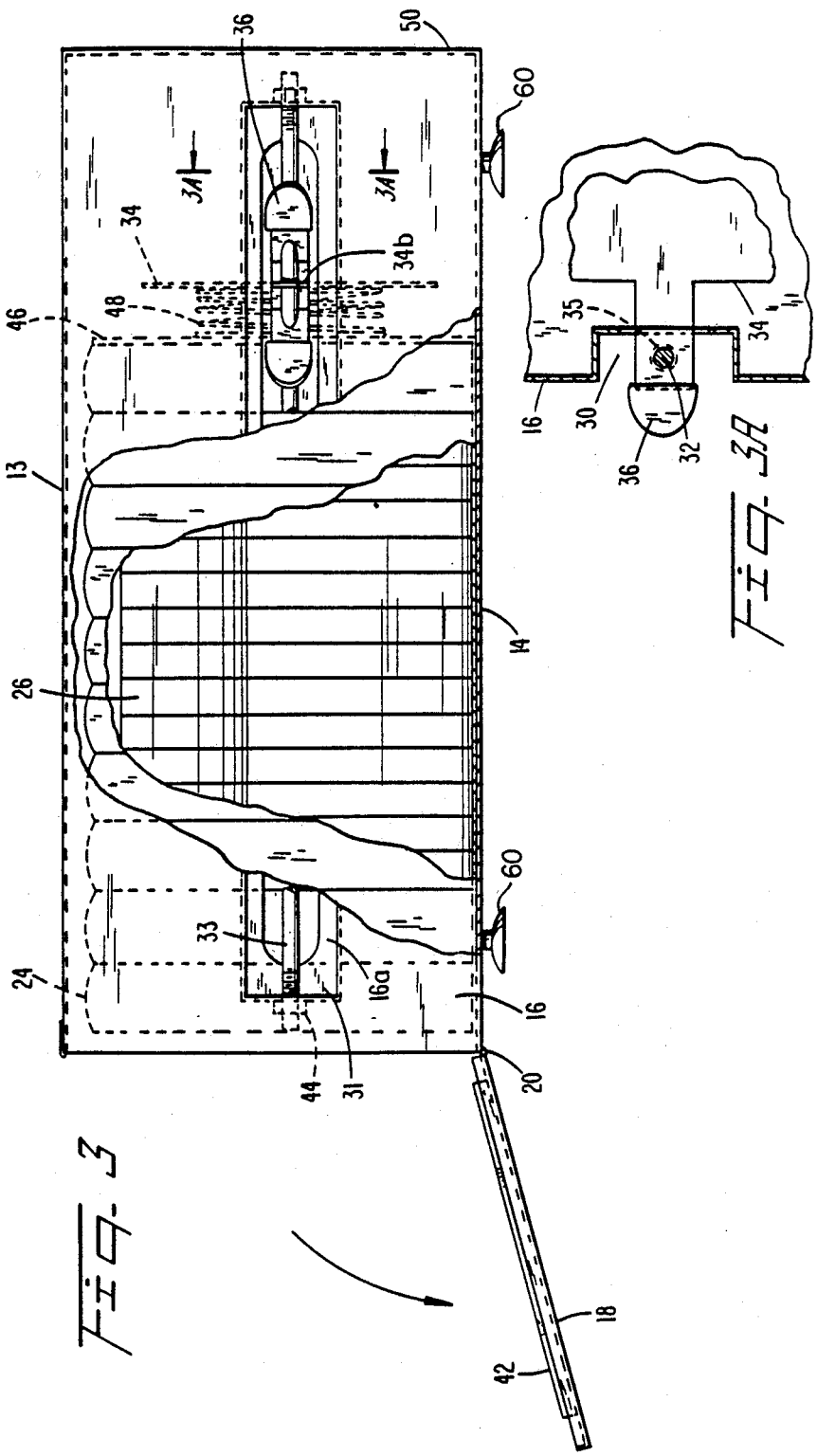

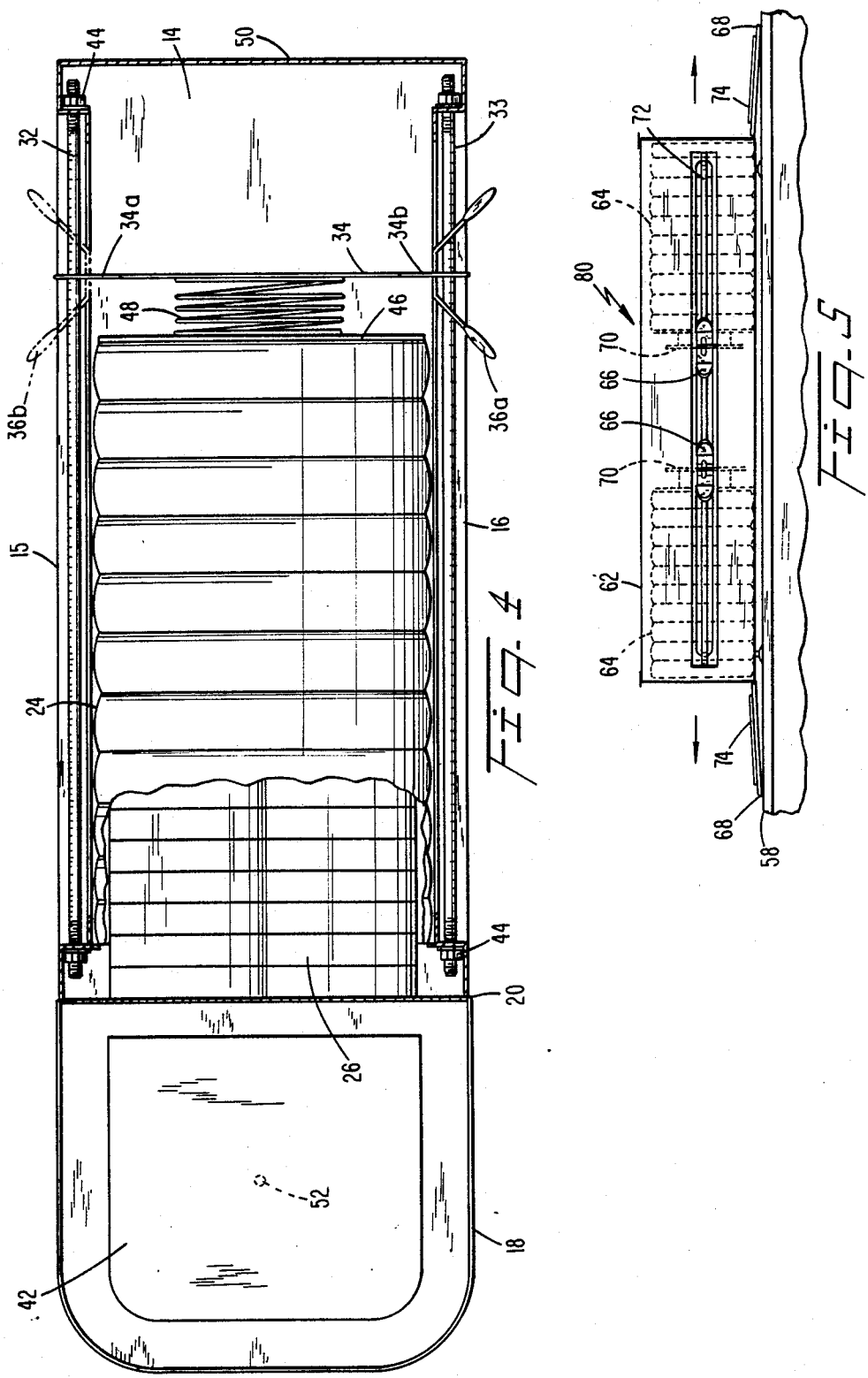

APPARATUS FOR SAFE STORAGE AND DISPENSATION OF SLICED BREAD

This application is a continuation of application Ser. No. 943,051, filed Dec. 18, 1986, abandoned.

FIELD OF THE INVENTION

This invention relates to apparatus for storing sliced bread safe from dust and other ambient contaminants and, more particularly, for storing a large number of bread slices in such a safe containment that enables the bread to breathe without drying out and facilitates manual dispensation of individual bread slices therefrom.

BACKGROUND OF THE INVENTION

Sliced bread is typically sold inside thin flexible paper or polyethylene envelopes which prevent dust and other ambient contaminants from coming into contact with the bread slices. Unless all the bread slices are consumed shortly after opening of the package, it is normally necessary to save and store the remaining slices. Packages of sliced bread often have provision for frequent opening and reclosure of the flexible envelope containing the bread slices. Access to bread re-enveloped in this manner may sometimes be inconvenient and at times even difficult, e.g., for children or handicapped persons or in high volume eating facilities such as a school or company cafeteria. Experience shows that a conveniently located and stable container of sliced bread is most useful if it also provides convenient dispensation of individual slices as needed. Unfortunately, although various apparatus for this purpose are known and commercially available, a number of problems still remain to be solved.

U.S. Pat. No. 3,298,568 discloses a casing inclined at a small angle to the vertical, for storing a number of bread slices removable one at a time by a tipping and sliding forward of a movable base. The removal of individual slices is effected by repeated motions of the base, which also serves to seal the bottom of the container. A hinged top of the container excludes dust from the uppermost slices stored within. However, over a period of time, these uppermost slices can lose moisture to the increasing empty space above them as more and more slices are withdrawn from below.

U.S. Pat. No. 4,034,895 stores a sliced loaf of bread at an incline within a larger container that has a hinged front door. A rotatable vane mounted at an axis just above the front slices is turned by a user to flip out individual slices through the open front door. The device depends on gravity to cause the plurality of slices to be biased forward The stored slices may lose a significant amount of moisture from their edges while thus stored within the larger outer container surrounding the inclined portion supporting the bread slices and the last few slices probably will dry out well before the rest.

U.S. Pat. No. 1,418,153 discloses an inclined container open at the top for storing a plurality of slices therein, the slices being urged forwardly down the incline by means of a weight supported on freely turning rollers. All the bread slices in this device remain exposed to air and dust and thus may dry out and are not well protected.

U.S. Pat. No. 1,732,643 discloses a bread storage box within which bread slices are held against one or more of the inside wall surfaces by means of soft helical compression springs. While this may prevent drying out of the end slices, all the slices remain free to lose moisture through their edges within the relatively large container itself.

Finally, U.S. Pat. No. 4,266,668 discloses a two-part telescoping tray, within which a loaf of sliced bread is retained within its own thin flexible envelope of which the front end may be held squeezed tight within a narrow slot provided therefor. With this device the user would have to open up the front of the envelope surrounding the loaf of sliced bread and reach in and remove individual slices and, thereafter, reclose the front of the envelope to exclude dust and to prevent drying out.

A need therefore exists for simple apparatus that will store a quantity of sliced bread in a manner that effectively excludes dust and other ambient contaminants, permits controlled dispensation of individual slices at the user's discretion, and holds the slices in a manner that limits drying out while permitting the bread slices to "breathe" to prolong the retention of freshness. For use in busy locations, e.g., a school or work cafeteria, the device must be capable of containing more than one loaf of bread and be locatable securely for convenient access by more than one user at a given time.

DISCLOSURE OF THE INVENTION

Accordingly, it is an object of this invention to provide apparatus for storing a plurality of bread slices safe from dust and other ambient contaminants, for easy dispensation of individual slices therefrom.

It is another object of this invention to provide apparatus for storing a plurality of bread slices safe from dust and other ambient contaminants, for easy dispensation of individual slices therefrom to a user, while restricting drying out of the stored bread over a period of time.

A further object of this invention is to provide apparatus for storing a plurality of bread slices safe from dust and other ambient contaminants, for convenient dispensation of individual slices of bread therefrom, wherein the bread is prevented from drying out rapidly but is permitted to breathe in order to prolong its freshness.

It is yet another object of this invention to provide apparatus within which more than one separately stored plurality of bread slices is individually dispensable to more than one user simultaneously, wherein the bread is stored safe from dust and other ambient contaminants, is prevented from drying out rapidly, and is permitted to breathe in order to prolong its freshness.

These and other objects of this invention are realized in an apparatus for storing a plurality of bread slices, for easy dispensation of individual slices therefrom, within an elongated flexible container open at one end and having bellows like foldable longitudinal sides. The flexible container is itself contained within and supported by the base surface of an external casing having an end closable by a hinged lid adjacent to the open end of the flexible container of bread. In a preferred embodiment of this invention, a movable platen plate is supported by the inside surface of the base of the external casing and is slidable by the user to push against the closed inside end of the flexible containment means and the sliced bread contained therewithin. A soft, flat, pillow-like element is attached centrally to the inside surface of the lid of the outside casing and, during storage of the bread slices, gently presses against the front surface of the foremost slice. A small aperture is provided within this lid in a manner that ensures against its blockage by the thin flexible pillow. While the bread slices are thus stored, they are free to breathe but because of the flexible container closely surrounding them they do not readily dry out over a period of time. In another aspect of the invention, a compressible helical spring is provided between the slidable platen and the rear of the flexible container to urge the bread slices toward the lid. In yet another aspect of this invention, one more suitable to high volume dining areas, two or more loaves of sliced bread are stored collinearly as described hereinabove, so as to allow dispensation of individual slices to one or more users simultaneously.

Still other objects and advantages of the present invention will become readily apparent to those skilled in the art from the following detailed description, wherein only the preferred embodiment of this invention is disclosed in detail simply by way of illustration of the best mode contemplated for carrying out the invention. As will be appreciated, this invention is amenable to other and different embodiments, and its several details are capable of modification in various obvious respects, all without departing from the invention. Accordingly, the drawing and description of the invention are to be regarded as illustrative and not restrictive in nature.

BRIEF DESCRIPTION OF THE DRAWINGS

FIG. 3 is a partially sectioned side elevation view of a preferred embodiment of this invention.

FIG. 3a is an enlargement of a portion of the manually operated platen element of the invention of FIG. 3.

FIG. 4 is a cross sectional plan view at section 4—4 of the embodiment of FIG. 1.

FIG. 5 is a side elevation view of an embodiment of this invention for the storage of two separate pluralities of bread slices for separate dispensation of individual slices from each.

DETAILED DESCRIPTION OF THE PREFERRED EMBODIMENT

Figure 1:
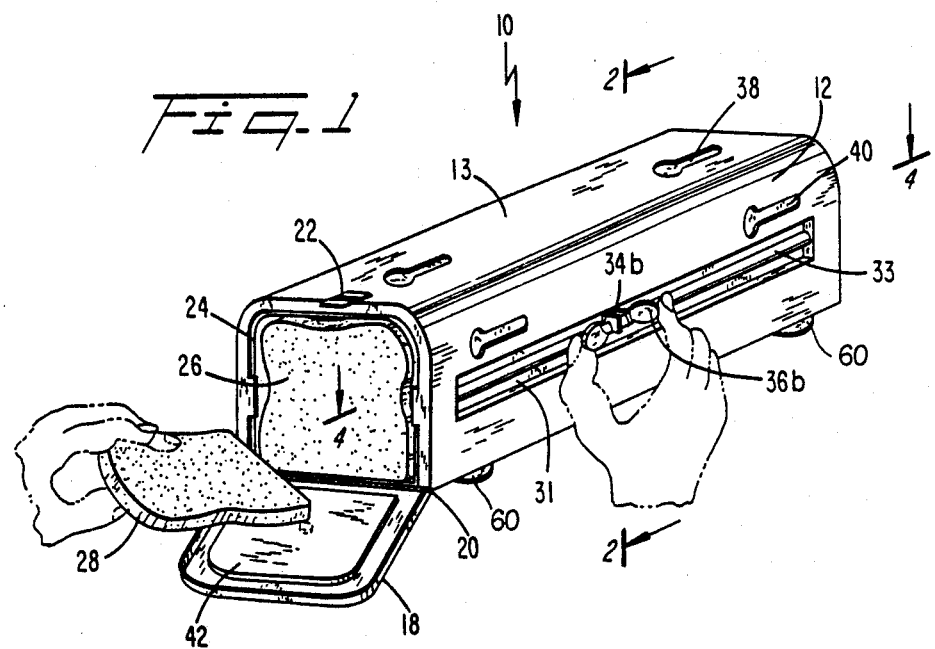
FIG. 1 is a perspective view of the preferred embodiment of this invention.

In most homes, where people prefer to eat their sliced bread within a relatively short period after purchase, it is likely that one or, at most, two loaves of bread need to be stored at any time. For such applications, as best seen with reference to FIG. 1, the apparatus of this invention needs to have a longitudinal dimension somewhat larger than the length of the stack of bread slices to be stored within. The apparatus 10, according to a preferred embodiment of this invention, has an outside casing 12 consisting of a substantially flat top 13, base 14, and longitudinal sides 15 and 16. A front end of the casing is open but is closable by a lid 18 hinged along the bottom edge at hinge 20. The rear end 50 of casing 12 is closed in this embodiment.

Figure 2:
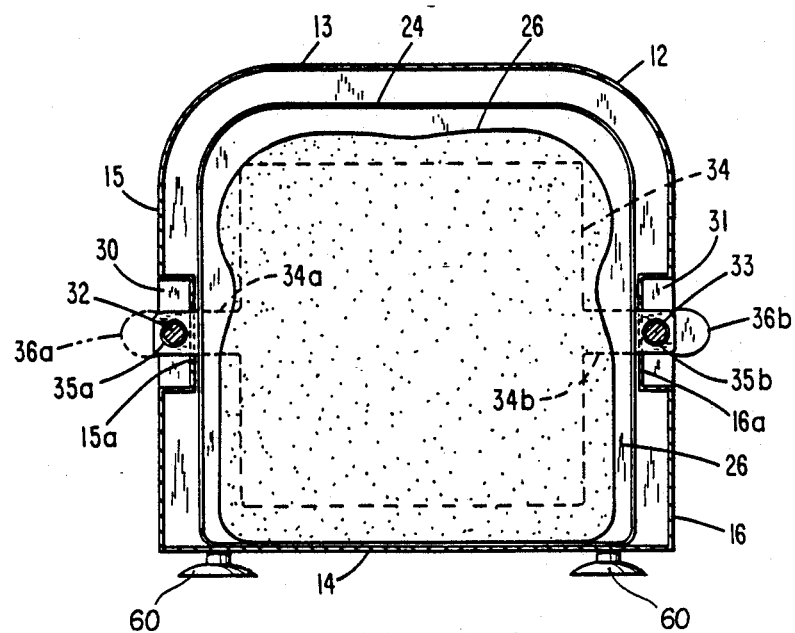
FIG. 2 is a transverse vertical cross-sectional view of the embodiment of FIG. 1 at section 2—2.

As best understood with reference to FIGS. 2 and 3, the inside surface of base 14 supports within casing 10 a flexible bellows-like sliced bread container 24 that has a closed inside end 46 and an open front end immediately adjacent the open front end of casing 10, i.e., immediately close to hinge 20 of lid 18. Lid 18 preferably opens to be essentially horizontal, and provides a support surface for any slices of bread extracted from storage. As indicated in FIG. 4, lid 18 is provided with at least one small breathing aperture or hole 52 and an essentially centrally located soft flat pillow-like element 42 that is sized and shaped to approximate the bread slices stored within the apparatus. Lid 18 is rotatable upward about hinge 20 until it engages latch 22 at the front edge of top 13.

As best seen in FIG. 2, the bottom surface of flexible container 24 slidably rests on the inner surface of bottom 14 of casing 10. The forward edge of the base portion of container 24, especially when container 24 is filled with a plurality of bread slices 26, is prevented from slipping out of casing 12 by hinge 20. Other alternatives for retaining the front of container 24 within casing 10 during normal use will no doubt occur to persons skilled in the art. Such alternatives may include a downwardly depending extension at the front edge of top 13 of casing 12 or short lateral extensions from sides 15 and 16 close to the open end of casing 10 closable by lid 18.

Flexible container 24 has a relatively stiff rear end surface 46. In one embodiment of this invention, as depicted in FIGS. 3 and 4, a relatively soft compressible helical spring 48 is located immediately to the outside rear surface of end 46, the other end of the spring contacting a movable vertically disposed platen plate 34. With this arrangement, when platen plate 34 is moved towards the lidded end of casing 10 it exerts a force through spring 48 on the rear end wall 46 of collapsible bread container 24, simultaneously pushing forward the slices 26 contained therewithin.

In the preferred embodiment of the invention, as depicted in FIGS. 1-4, the movable platen plate 34, in its simplest form, is merely a rectangular plate with short narrow lateral extensions 34a and 34b (see FIG. 2). These extensions 34a and 34b project outwardly through narrow longitudinal slots 15a and 16a provided in sides 15 and 16, respectively, of casing 10. Slots 15a and 16a are most conveniently formed within the base surfaces of longitudinal recesses 30 and 31 provided in sides 15 and 16 of casing 10.

Two similar parallel rods 32 and 33 are affixed adjacent and parallel to apertures 15a and 16a respectively. These rods 32 and 33 are conveniently threaded at their respective ends and are affixed to casing 10 by nuts typified by nut 44 in FIG. 4. Extensions 34a and 34b of platen plate 34 are provided with apertures 35a and 35b respectively to accommodate the sliding passage therethrough of rods 32 and 33 respectively. This is best seen in FIG. 2. To these extensions 34a and 34b of platen plate 34 are conveniently attached springy spread-apart latch elements 36a and 36b each designed to have a pair of user graspable wings through which rods 32 and 33 are passed. The wings of latch elements 36a and 36b are squeezable by the user, as indicated in FIG. 1, to release their grip on rods 32 and 33 respectively. It will be immediately understood by persons skilled in the art that it is not necessary to provide both latch elements 36a and 36b for most applications, just one of the latch elements being sufficient to affix platen plate 34 at a position desired by the user within casing 10.

As indicated previously, the flat soft cushion 42 attached to the inside surface of lid 18 is attached in a manner that does not block breathing hole 52 in lid 18. This may be accomplished by providing a ridged surface to either lid 18 or to the surface of pillow 42 contacting lid 18. These details are not shown in the figures for the sake of simplicity, and it is believed that persons skilled in the art can easily effect the appropriate design of lid 18 and/or pillow 42 to accomplish the purpose just described.

The apparatus of the preferred embodiment is easy to use. Thus, a user who purchases a loaf of sliced bread will open one end of the flexible envelope around the bread slices 26 and insert that end of the wrapped loaf of bread into flexible container 24, thereafter pushing the slices 26 of the bread into the container while pulling away the flexible envelope (not numbered and not shown). Naturally, platen 34 at this point must be located rearwardly within casing 10 to allow the flexible folding-sided container 24 to expand into casing 10 to accommodate all the slices 26 placed therein.

The user then closes lid 18 and moves platen 34 by manually releasing latch element 36b with one hand. In the alternative, if latch elements 36a and 36b are both present, the user will release both latches 36a and 36b to move platen 34 forward to the extent permitted by soft compressive spring 48.

At this point, a plurality of bread slices 26 is contained within a flexible container 24, the front of which is effectively closed by soft pillow 42 pressing against the forwardmost sliced bread surface. There is, at this time, only a small volume of air surrounding bread slices 26 contained within container 24. However, this small volume of air does communicate with the outside of casing 10 through breathing aperture or hole 52 behind cushion 42. While the bread slices are stored in this manner, any vapors or gases released from the bread slices slowly leak out through breathing hole 52 and, as temperature and barometric changes occur, small amounts of air from the outside can enter through breathing hole 52 into the air space surrounding bread slices 26.

If the user now wishes to obtain one or more slices of bread, he or she opens lid 18, whereupon the gentle forward biasing pressure of spring 48 will cause the forwardmost slice to fall forward onto cushion 42. If more slices are desired, the user simply unlatches platen 34 from rods 32 and 33 and moves it forward somewhat, thereby compressing spring 48 and biasing the stored bread slices 26 forwardly to provide additional slices. If no more slices are desired, the user simply lifts lid 18 to its closed position to store the rest.

The preferred embodiment of this apparatus may conveniently be mounted on feet 60 resting on a kitchen counter or a dining room table. Alternatively, in order to suspend casing 10 from a horizontally disposed surface, e.g., underneath kitchen shelves, it may be convenient to provide key-shaped openings such as 38 in top 13 of casing 10. These openings 38 can then be engaged, in conventional manner, to extending portions of conventional screws extending from a support surface (not shown). Any forward force exerted by a user grasping platen latches 36a and 36b and pulling on them to move out bread slices will not cause casing 10 to detach from said screws threaded, for example, into the underneath surface of a horizontal shelf. In yet another alternative, casing 10 may be mounted at one of its sides by means of key-shaped openings 40 for engagement at the longitudinal side thereof. With such side mounting of the apparatus, only one latch need be provided on the side opposite to the mounted side.

As previously discussed, this apparatus is particularly suitable for dispensing individual slices simultaneously from more than one plurality of stored bread slices, e.g., in a high school or work cafeteria. As best seen in FIG. 5, the basic concept of this invention can be extended by providing in such an embodiment 80 a relatively long outer casing 62, two similar platens 70 affixable to a shared rod 72 on each side by similar latches 66. Similar flexible inside casings 64 are provided with their open ends adjacent lids 68 at each end of casing 62. Hinged lids 68 conveniently open to a virtually horizontal position on support surface 58 and are provided with flat cushion elements 74 comparable to cushion element 42 described hereinabove in detail. As persons skilled in the art will immediately appreciate, embodiment 60 utilizes all the beneficial features of the simpler preferred embodiment 10, e.g., small breathing holes in each lid 68, with obvious differences.

A variety of materials may be considered for casing 12 and flexible bread container 24 within. Thus, casing 12 may be made of metal or of fairly tough plastic which may be colored or transparent. Likewise, flexible bellows-like internal container 24 may advantageously be made of a readily washable plastics material such as nylon. Soft pillows 42 or 74 may, likewise, be made of easy-to-clean plastics material.

It is anticipated that persons skilled in the art, armed with the knowledge provided by this disclosure, will contemplate a variety of modifications in the structure and uses of this invention. All such modifications and variations are expressly contemplated as being within the claims appended below.

What is claimed is:

1. Apparatus for storing sliced bread for easy dispensation of individual slices therefrom, comprising:
   elongate bread containment means for containing a plurality of upright bread slices in a horizontally disposed array, said containment means having flexible, bellows-like, foldable longitudinal sides, a closed end and an open end;
   casing means for encasing and permanently retaining said containment means, said casing means having longitudinal sides, an essentially horizontal base with an inside surface slidably supporting said containment means and at least one end provided with a lid openable by a user, said open end of said containment means disposed immediately adjacent said lid, said casing means including means for engaging said containment means to retain the same inside said casing means; and
   user-operated moving means movably supported inside said casing means for moving said closed end of said containment means toward said lid, to thereby facilitate sequential access to said plurality of contained bread slices when said lid is opened.

2. Apparatus according to claim 1, wherein:
   said lid is hinged along a bottom edge to said casing means and is formed to latch shut by engaging a portion of said casing means above said hinge.

3. Apparatus according to claim 2, wherein:
   said lid is formed with small vent hole to allow said bread slices to breathe during their containment.

4. Apparatus according to claim 1, wherein:
   an external surface of said casing means is formed for readily detachable attachment to a support surface for convenient mounting of the apparatus and dispensation of bread slices therefrom.

5. Apparatus for storing sliced bread for easy dispensation of individual slices therefrom, comprising:
   elongate bread containment means for containing a plurality of upright bread slices in a horizontally disposed array, said containment means having flexible, bellows-like, foldable longitudinal sides, a closed end and an open end;

casing means for encasing said containment means, said casing means having longitudinal sides, an essentially horizontal base with an inside surface slidably supporting said containment means and at least one end provided with a lid openable by a user, said open end of said containment means being disposed immediately adjacent said lid, wherein said lid is hinged along a bottom edge to said casing means and is formed to latch shut by engaging a portion of said casing means above said hinge and said lid is formed with a small vent hole to allow said bread slices to breathe during their containment;

user-operated moving means movably supported inside said casing means for moving said closed end of said containment means toward said lid, to thereby facilitate sequential access to said plurality of contained bread slices when said lid is opened; and a generally flat, flexible cushion element, smaller in area than an inside surface of said lid and attached essentially centrally thereto, said cushion being shaped to avoid totally blocking said vent hole under normal use, whereby any contact between said cushion and the closest bread slice is a soft contact and said contained bread slices are free to breathe even when said lid is shut.

6. Apparatus according to claim 5, wherein:
a first one of said longitudinal sides of said casing means is formed to have a first narrow longitudinally disposed aperture, and a first portion of said moving means extends therethrough to facilitate movement thereof by a user.

7. Apparatus according to claim 6, wherein:
said longitudinally apertured first side of said casing means is formed to have a first recess such that said first aperture is substantially encompassed by a base surface of said first recess.

8. Apparatus according to claim 7, further comprising:
first fixing means for fixing said moving means at a predetermined position within said casing means.

9. Apparatus according to claim 8, wherein:
said first fixing means comprises a first elongate fixed member attached to said casing means to be adjacent and parallel to said first narrow longitudinally disposed aperture, and said first portion of said moving means extending through said first narrow longitudinally disposed aperture is formed to releasably grasp said first elongate fixed member at a position selected by the user.

10. Apparatus according to claim 9, further comprising:
first biasing means for biasing said closed end of said containment means toward said open end thereof.

11. Apparatus according to claim 10, wherein:
said first biasing means comprises a helical spring located intermediate said moving means and said closed end of said containment means.

12. Apparatus according to claim 9, wherein:
a second one of said longitudinal sides of said casing means, parallel to said first longitudinal side such that said bread slices are contained therebetween, is formed to have a second narrow longitudinally disposed aperture, and a second portion of said moving means extends therethrough to facilitate movement thereof by a user.

13. Apparatus according to claim 12, wherein:
said longitudinally apertured second side of said casing means is formed to have a second recess such that said second longitudinal aperture is substantially encompassed by a base surface of said second recess.

14. Apparatus according to claim 13, further comprising:
second fixing means for fixing said moving means at a predetermined position within said casing means.

15. Apparatus according to claim 14, wherein:
said second fixing means comprises a second elongate fixed member attached to said casing means to be adjacent and parallel to said second narrow longitudinally disposed aperture, and said second portion of said moving means extending through said second narrow longitudinally disposed aperture is formed to releasably grasp said second elongate fixed member at a position selected by the user.

16. Apparatus for storing two quantities of sliced bread for easy dispensation of individual slices therefrom, comprising:
first and second elongate bread containment means each for containing a plurality of upright bread slices in a horizontally disposed array, each of said containment means having flexible, bellows-like, foldable longitudinal sides, a closed end and an open end, with the respective closed ends being mutually adjacent;

casing means for encasing and permanently retaining said first and second containment means collinearly, said casing means having longitudinal sides, an essentially horizontal base with an inside surface slidably supporting said first and second containment means and having two open opposite ends each provided with a lid openable by a user, said open end of said containment means each disposed immediately adjacent a respective one of said lids, said casing means including means for engaging a respective one of said containment means to retain the same inside said casing means; and user-operated moving means movably supported inside said casing means for individually moving said closed end of said first and second containment means toward a respective one of said lids, to thereby facilitate sequential access to said plurality of contained bread slices therethrough.

17. Apparatus according to claim 16, wherein:
each of said two lids is formed with a small vent to allow said bread slices to breathe during their containment.

18. Apparatus according to claim 17, wherein:
two parallel longitudinally disposed vertical sides of said casing means are each formed to have a longitudinally disposed aperture, and a pair of extensions are provided to each of said moving means such that one extension of each pair extends through a corresponding one of said apertures in said two parallel sides of said casing means.

19. Apparatus according to claim 18, wherein:
fixing means are provided to each of said moving means for fixing thereof with respect to said casing means at positions selected by the user.

20. Apparatus according to claim 19, further comprising:
biasing means for biasing said close ends of said first and second containment means toward said respective open ends thereof.

21. Apparatus according to claim 20, wherein:

said biasing means comprise a helical spring between the closed end of each of said first and second containment means and the corresponding one of said moving means.

22. Apparatus according to claim 21, wherein: an external surface of said casing means is formed for readily detachable attachment to a support surface for convenient mounting of the apparatus and dispensation of bread slices therefrom.

* * * * *